(12) United States Patent
Petruch et al.

(10) Patent No.: US 11,968,092 B2
(45) Date of Patent: Apr. 23, 2024

(54) METHOD FOR CONFIGURING A WEARABLE USER EQUIPMENT, WEARABLE USER EQUIPMENT AS WELL AS WORK SYSTEM

(71) Applicant: Workaround GmbH, Münich (DE)

(72) Inventors: Sebastian Petruch, Münich (DE); Matthias Kirchner, Münich (DE)

(73) Assignee: WORKAROUND GMBH, Munich (DE)

( * ) Notice: Subject to any disclaimer, the term of this patent is extended or adjusted under 35 U.S.C. 154(b) by 0 days.

(21) Appl. No.: 18/116,235

(22) Filed: Mar. 1, 2023

(65) Prior Publication Data

US 2023/0283519 A1    Sep. 7, 2023

(51) Int. Cl.
*H04L 41/08*    (2022.01)
*H04L 41/0816*    (2022.01)

(52) U.S. Cl.
CPC ...... *H04L 41/0886* (2013.01); *H04L 41/0816* (2013.01)

(58) Field of Classification Search
None
See application file for complete search history.

(56) References Cited

U.S. PATENT DOCUMENTS

| | | | | |
|---|---|---|---|---|
| 7,739,396 | B2* | 6/2010 | Adams | H04L 67/125 709/219 |
| 7,796,014 | B2* | 9/2010 | Traub | H04L 65/70 235/375 |
| 8,046,588 | B2* | 10/2011 | Gibart | G06F 21/32 726/17 |
| 8,373,545 | B2* | 2/2013 | Traub | G06K 7/01 340/10.5 |
| 9,021,431 | B2* | 4/2015 | Laval | G06F 8/36 717/121 |

(Continued)

FOREIGN PATENT DOCUMENTS

| | | |
|---|---|---|
| DE | 102019118969 A1 | 1/2021 |
| DE | 102020106369 A1 | 9/2021 |

OTHER PUBLICATIONS

Abner Li, "Google releases Wear OS 'Health Services' component that's updatable via the Play Store", 9TO5Google, Sep. 27, 2021, 4 pages.

(Continued)

*Primary Examiner* — Backhean Tiv
(74) *Attorney, Agent, or Firm* — Dilworth IP, LLC

(57) ABSTRACT

A method for configuring a wearable user equipment for executing sub-processes is shown, wherein the user equipment has a communication link with a device server, and the different sub-processes and the configuration sets for the user equipment associated with the sub-processes are stored on the device server. The method includes a selection of one of the sub-processes stored on the device server that is to be executed by the user equipment, and an automatic application of the configuration of the configuration set associated with the selected sub-process on the wearable user equipment, wherein changes by the user at least to parts of the configuration of the user equipment applied by the configuration set are blocked. Furthermore, a wearable user equipment as well as a work system are shown.

20 Claims, 3 Drawing Sheets

(56) References Cited

U.S. PATENT DOCUMENTS

| | | | |
|---|---|---|---|
| 9,467,795 B2* | 10/2016 | Kreitzer | H04W 4/50 |
| 10,296,104 B2* | 5/2019 | Sendai | G06F 3/0485 |
| 10,476,972 B2* | 11/2019 | Umphreys | H04L 67/535 |
| 10,884,729 B2* | 1/2021 | Naibero | H04L 67/55 |
| 11,179,791 B2* | 11/2021 | Matsuzaki | G06F 13/4282 |
| 11,763,250 B2* | 9/2023 | Ferreira | H04W 4/80 |
| | | | 705/28 |
| 2007/0208832 A1* | 9/2007 | Traub | H04L 67/34 |
| | | | 340/572.1 |
| 2016/0026211 A1* | 1/2016 | Luna | G06F 3/0634 |
| | | | 361/679.03 |
| 2021/0022676 A1* | 1/2021 | Lamego | A61B 5/02055 |
| 2021/0278900 A1* | 9/2021 | Kirchner | G06F 3/147 |
| 2023/0086565 A1* | 3/2023 | Ding | G06F 9/54 |
| | | | 717/170 |
| 2023/0118880 A1* | 4/2023 | Gersht | G06F 21/53 |
| | | | 718/1 |
| 2023/0283519 A1* | 9/2023 | Petruch | H04L 41/0886 |
| | | | 709/221 |
| 2023/0283995 A1* | 9/2023 | Hutter | H04W 4/80 |
| | | | 455/466 |

OTHER PUBLICATIONS

Android Enterprise Security White Paper (updated Jan. 2020), <https ://static. g oog leuserconten t.com/media/www.android.com/de//static/2016/pdfs/enterprise/Android_ Enterprise_ Security_White_ Paper_2019.pdf>, 39 pages.

Mike Burr, "Android Enterprise Security White Paper details defenses", Android Enterprise, Jan. 15, 2020, 1 page.

Giancarlo Bo, et al. "Wearable Computing and Mobile Workers: The Aeronautic Maintenance Showcase in the WearIT@Work Project", UTC from IEEE Xplore, Jan. 31, 2023, 12 pages.

Search Report issued in German Patent Application No. 10 2022 104 944.2, dated Feb. 1, 2023, 2 pages.

* cited by examiner

METHOD FOR CONFIGURING A WEARABLE USER EQUIPMENT, WEARABLE USER EQUIPMENT AS WELL AS WORK SYSTEM

FIELD OF THE DISCLOSURE

The disclosure relates to a method for configuring a wearable user equipment for executing sub-processes, a wearable user equipment as well as a work system.

BACKGROUND

Work systems by means of which complex processes are executed are known. Here, sub-processes or several process steps are usually executed by machines and other process steps by workers or users.

The machines may be industrial robots or devices that are wearable by the user, such as barcode readers.

The users may be instructed by wearable, personalised devices, hereinafter termed user equipment, so that they execute the required step correctly at that time in the complex process. For example, such user equipment includes a barcode scanner and a display screen.

Examples of such work systems are assembly lines of complex products, such as cars, or large distribution warehouses.

The processes or sub-processes executed with the work system are usually planned meticulously to be as efficient as possible and to ensure the greatest possible process reliability as well as safety of the user W.

To this end, different sub-processes are defined which are executed by different users. The sub-processes call for different performance requirements for the user equipment. It is therefore necessary that the user equipment is always configured correctly for each sub-process to be executed.

To this end, various sub-processes in an operation can be executed in principle by the same user equipment. Therefore, the user equipment is frequently reconfigured for individual sub-processes as required by the worker in order to be adapted to the individual sub-processes.

This can result in misconfigurations or the user can change the settings on the device intentionally or unintentionally. As a result, deviations from the intended sub-process occur which reduce the quality of the process and, for example, the quality of the product produced.

SUMMARY

There is provided a method as well as a user equipment, by means of which deviations from intended sub-processes are avoided reliably.

The object is solved by a method for configuring a wearable user equipment for executing sub-processes, wherein the user equipment has a communication link with a device server, and various sub-processes and configuration sets for the user equipment associated with the sub-processes are stored on the device server. The method comprises the following steps:

selection of one of the sub-processes stored on the device server that is to be executed by the user equipment, and automatic application of the configuration of the configuration set associated with the selected sub-process on the wearable user equipment.

To this end, changes by the user at least to parts of the configuration of the user equipment applied by the configuration set are blocked.

It is also conceivable that further users have access to the device server in addition to the administrator of the device server, wherein only users with corresponding rights (and the administrator) can make changes to the configurations or the configuration sets. The remaining users are also blocked from making changes.

In particular, it is not possible for the users of the user equipment to change the configurations of the sub-processes.

As the correct configuration is applied automatically after selecting the sub-process and is blocked from being changed further, it is always ensured that the user equipment is configured correctly and there are thus no deviations from the intended process. In this way, the process reliability is improved and thus the quality of the process.

The configuration is used in particular immediately after being applied.

For example, a configuration set is provided for each sub-process and for each user equipment and/or each device of the user equipment.

Within the scope of this disclosure, a sub-process is understood to mean in particular a predetermined sequence of process steps. For simplification, within the scope of this disclosure, a sub-process is referred to even if no further sub-processes exist, thus the sub-process constitutes the entire process.

For example, the user equipment in conjunction with a process control executes the sub-process, in particular in such a way that the user executes the predetermined process steps using the user equipment and the results are transmitted to the process control.

In an embodiment, the parts of the configuration are determined in the configuration set, whose change by the user are blocked, and/or the entire configuration of the user equipment applied by the configuration set is blocked for changes by the user. It is thus ensured that the user cannot change critical settings of the user equipment.

To improve the ergonomics, the user equipment can comprise a garment, in particular a glove, and a sensor and/or information device that is attached to the garment, wherein the sensor and/or information device uses the configuration.

For example, the garment and/or the sensor and/or information device comprise at least one input means, in particular a trigger, wherein at least one function of the sensor and/or information device, in particular the sensor, is triggered by actuating the input means when the sensor and/or information device is received in the garment, thereby enabling the sensor and/or information device to be used particularly efficiently.

In an embodiment, the user equipment comprises a main device and a secondary device, wherein the secondary device is a sensor and/or information device and the main device maintains the communication link to the device server, wherein the secondary device and/or the main device use the configuration. In this way, the functionality of the user equipment can be extended without increasing the dimensions of the secondary device.

To provide a versatile main device, the main device can be a wearable smart device, in particularly a smartphone, a tablet, a laptop, a smart watch or smart glasses.

Irrespective of whether the user equipment comprises a main device and a secondary device, the connection device can be a wearable smart device, in particular a smartphone, a tablet, a laptop, a smart watch or smart glasses.

In an embodiment, the sub-process to be executed by the user equipment is selected by:
  input or selection of the sub-process by the user on the user equipment, in particular on the sensor and/or information device, main device and/or secondary device; and/or
  input or selection of the sub-process by an administrator on the device server.

In this way, the user equipment can be adapted to the respective task to be executed by the user personally.

To select the sub-process extremely simply, the user equipment, in particular the sensor and/or information device or the secondary device, can comprise a sensor, in particular a barcode reader, and wherein the sub-process to be executed by the user equipment is selected by reading information, in particular a barcode, by means of the sensor and by determining the sub-process to be selected using the information read.

The information read can identify the sub-process and/or the sub-process can be assigned certain information, e.g., the information is an identifier of a workstation and each sub-process is assigned to one of the workstations.

Alternatively, or additionally, the current location of the user equipment is determined and the sub-process to be executed by the user equipment is selected based on the current location so that no user input is necessary.

For example, the user equipment, in particular the main device, determines the current location and/or wherein the device server determines the current location of the user equipment, in particular wherein the user equipment receives the configuration set associated with the selected sub-process from the device server.

In an embodiment, the user equipment, in particular the main device, determines the sub-process to be executed by the user equipment by means of the current location, in particular wherein the user equipment retrieves the configuration set associated with the selected sub-process. As a result, the location can be determined simply using components of the user equipment.

The configuration set can be retrieved from a storage device of the user equipment or from the device server.

In an embodiment, the sub-process selected based on the current location is executed at least in part in a region comprising sensitive infrastructure, wherein the user equipment is set by applying the configuration of the configuration set associated with this sub-process in such a way so that during use the user equipment avoids disturbing the sensitive infrastructure, thereby increasing the potential application areas of the user equipment.

In one aspect, the current time and/or the user of the user equipment is determined and the sub-process to be executed by the user equipment is selected based on the current time and/or the user so that the sub-process can be selected very specifically without an increase in effort.

The user can be determined, for example, based on a user identification. The user identification can be linked to a specific user equipment or individual devices thereof. It is also conceivable that the user must identify themselves on the user equipment before using the user equipment, thereby determining the user identification.

To enable a particularly good adaptation of the user equipment to the requirements of the sub-process, the configuration can determine at least one characteristic of the user equipment, in particular
  the permitted and/or prohibited radio frequency bands and/or protocols for communication with the device server, with other user equipment and/or of parts of the user equipment with each other;
  the process steps for the sub-process, their sequences, the expected results of the process steps, instructions to be outputted to the user on the process steps, the data format in which the sensor data is obtained and/or transmitted to the process control, and/or at least one processing step that indicates how the obtained sensor data is to be processed and/or manipulated before transmission to the process control; and/or
  the functions of the user equipment that are required for the corresponding process step and/or sub-process, in particular wherein only the necessary functions are selectable by the user.

Parts of the user equipment is understood to mean, in particular, the main device and the secondary device which have a communication link with each other wirelessly.

In an embodiment, at least one application is executed on the main device, wherein that said at least one application is determined which is currently being operated on the main device, in particular which screen of the application is currently being operated. The sub-process to be executed by the user equipment, in particular the secondary device, is selected based on the application currently being operated, in particular the screen being currently operated, in particular wherein the user equipment retrieves the configuration set associated with the selected sub-process. In this way, switching between applications is greatly simplified and/or non-linear user guidance is facilitated within the applications with process reliability.

A screen is not understood to mean the physical display device ("screen display"), but rather the view on such a screen display, also termed "screen", "screen view" or "input mask".

An application or a screen can be regarded as "being currently operated" if it is being currently executed in the foreground, if it has been executed or shown most recently and/or if it receives data captured by the secondary device.

To enable simple changes to sub-processes or the adaptation of configurations if one of the sub-processes and/or one of the configuration sets are changed on the device server by an administrator of the device server, the following steps are executed:
  the user equipment that is to execute the changed sub-process and/or sub-process whose configuration set has been changed, receives the updated configuration set of the changed sub-process and/or the changed, updated configuration set, and
  the configuration of the updated configuration set is applied automatically by the user equipment.

In an embodiment, when the communication link with the device server exists, the user equipment checks according to a predefined system, at regular intervals, when establishing the communication link and/or in predefined events, whether an updated configuration set is available for the currently executed sub-process and/or whether the user equipment is to now execute another sub-process and, if applicable, receives from the device server an updated configuration set for the currently executed sub-process and/or the configuration set for the sub-process to be executed now by the user equipment. It is thus ensured that the user equipment is always up to date.

A predefined event is, for example, the connection of the user system or parts thereof to a power supply.

In particular, the user equipment receives at the same time the instruction to apply the configuration of the received configuration set.

Moreover, the object is solved by means of a wearable user equipment that is configured to execute a method as described previously.

The features and advantages mentioned for the method equally apply to the user equipment and vice versa. Here, the components of the user device are configured to also execute method steps to be executed by them in the method.

The object is also solved by a work system comprising a wearable user equipment, in particular as previously described, and a device server, wherein the work system is configured to execute a method as previously described.

The features and advantages mentioned for the method and/or for the user equipment equally apply to the work system and vice versa. Moreover, the components of the work system are configured to also execute method steps to be executed by them in the method.

BRIEF DESCRIPTION OF THE DRAWINGS

Additional features and advantages of the disclosure are found in the following description as well as the attached drawings to which reference is made. In the drawings.

DETAILED DESCRIPTION

Lists having a plurality of alternatives connected by "and/or", for example "A, B and/or C" are to be understood to disclose an arbitrary combination of the alternatives, i.e., the lists are to be read as "A and/or B and/or C" or as "at least one of A, B or C". The same holds true for listings with more than three items.

Figure 1:
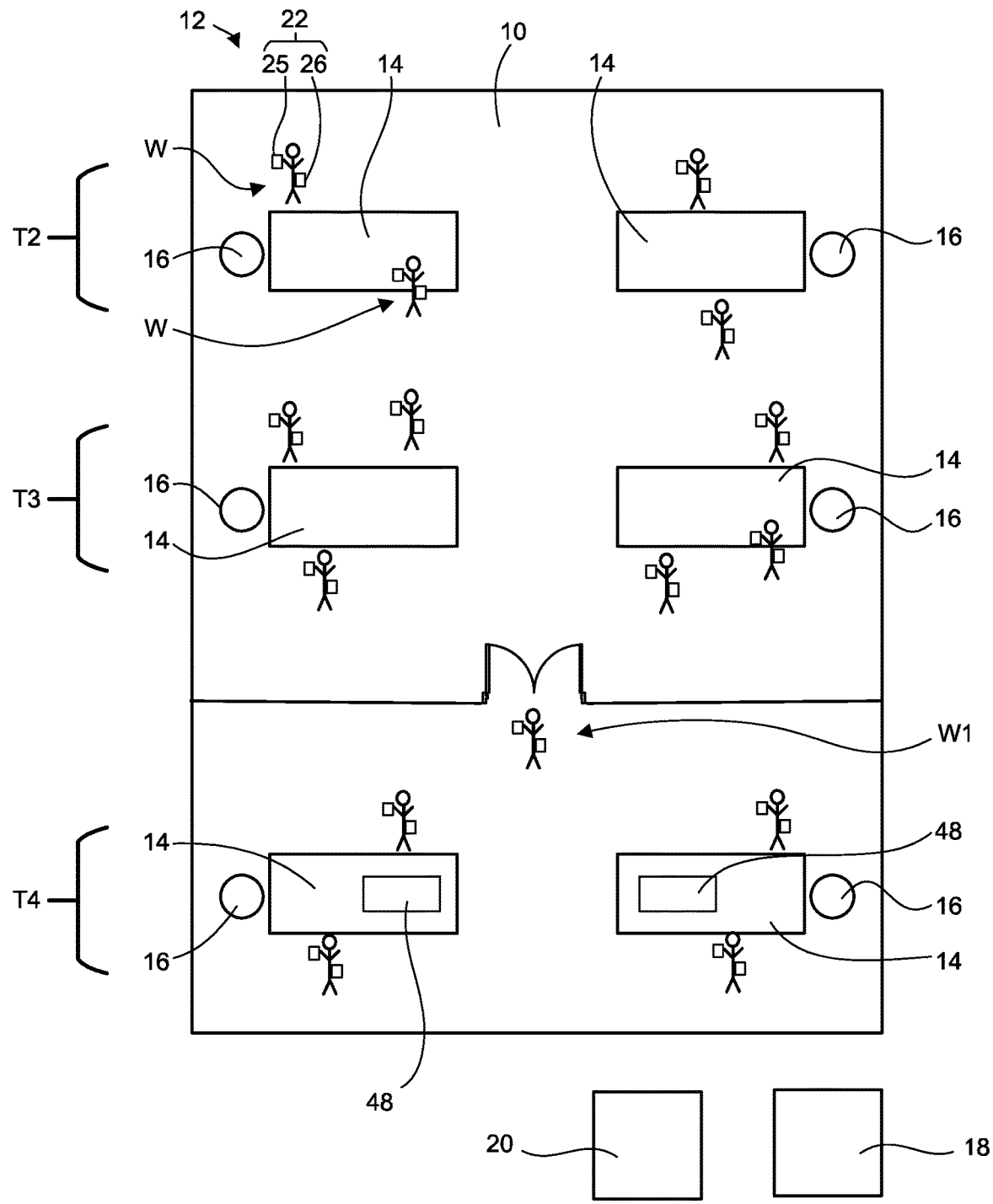
FIG. 1 shows schematically a building comprising a work system according to the disclosure.

In FIG. 1, a building 10 as well as a work system 12 are shown extremely schematically in an aerial perspective.

The building 10 is a part of an operation that produces a product. For example, the product is a vehicle or parts for this.

To produce the product, a predefined process is to be executed comprising various process steps which are be executed by users W.

Instead of the user, it is conceivable that autonomous robots or drones are used as the user W.

The entire process can be subdivided into various sub-processes to reduce the complexity of the sub-processes and increase productivity.

The entire process or also only a sub-process can be executed in the building 10, for example if several, spatially separated production sites are available.

The sub-process itself can in turn be subdivided into smaller sub-processes. This division can be executed multiple times, e.g. in highly complex products such as a vehicle, so that the entire process is subdivided into several hierarchical levels of sub-processes and sub-processes of the sub-processes etc. However, within the scope of this disclosure, only "sub-process" is referred to for simplification, whereby any sub-process in any hierarchical level can be meant.

Each sub-process comprises various process steps which are executed by users W at the various workstations 14.

To this end, different workstations 14 of the work system 12 are located in the building 10, at said workstations one or more of the process steps are executed. Thus, in each case, a specific sub-process is executed at the different workstations 14.

The workstations 14 are shown, for example, statically. Of course, the workstations 14 can also be sections of an assembly line production.

In the shown embodiment, two production lines each comprising three workstations 14 are provided. The workstations 14 of a production line are adjacent each other; in FIG. 1 they are perpendicular to each other.

The production lines are thus arranged parallel to each other.

In addition, the work system 12 comprises at least one base station 16 for a wireless communication, a device server 18, a process control 20, a plurality of user equipment 22 and several wireless connection devices 26.

The base stations 16 are arranged in such a way that their range covers at least parts of the process region (also termed shopfloor). In the example, the process region is the interior of the building 10 and the base stations 16 are provided in the building 10.

The base station 16 is a stationary device, such as an access point.

The base stations 16 are connected to the device server 18 and the process control 20, for example via LAN or the Internet. The device server 18 and the process control 20 are thus accessible wirelessly by the user equipment 22 in the process region.

The process control 20 and/or the device server 18 are operated on one or more central computers and/or servers.

The process system 20 is, for example, an inventory management system, an enterprise resource planning system (ERP system) or suchlike and is used for monitoring, for quality management and for controlling the processes of the work system 12, e.g., the processes for producing the product.

The device server 18 is used for the administration of the user equipment 22 or the devices of the user equipment 22, in particular for the configuration, monitoring, maintenance and/or administration of the user equipment 22 or the devices of the user equipment 22.

It is also conceivable that the device server 18 is integrated into the process control 20.

Each of the user equipment 22 comprises at least one sensor device 24 and/or at least one output means 30.

Figure 2:
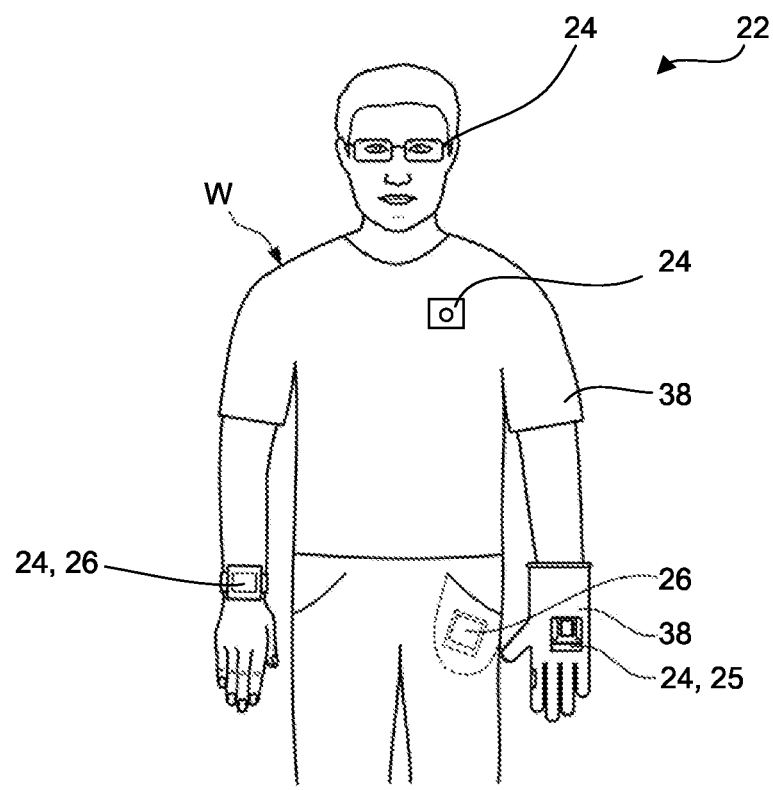
FIG. 2 shows a user of the work system with a user equipment of the work system according to the disclosure according to FIG. 1.

The sensor devices 24 are worn by the workers W. For example, each user W wears at least one or more sensor devices 24, as shown in FIG. 2.

The sensor devices 24 comprise a sensor 28 as well as optionally an output means 30 and an actuating element 32.

The sensor devices 24 are, for example, headsets with a microphone as sensor 28 and headphones as output means 30. In addition, the headset can comprise a pushbutton as an actuating element 32.

For example, a sensor device 24 can also be a camera, for example a helmet camera or a camera attached to a garment. The camera acts as a sensor 28 and optional display screens, LEDs, loudspeakers or pushbuttons of the camera as output means 30 and actuating elements 32.

A barcode reading device can also be a sensor device 24, wherein the barcode reader of the barcode reading device is the sensor 28 and optional display screens, LEDs, loudspeakers or pushbuttons of the camera act as output means 30 or actuating elements 32.

Within the scope of this disclosure here, a barcode is understood to mean any code, such as barcodes, matrix codes, QR codes and suchlike.

Wearable sensor and/or information devices 25 may also be used as sensor devices 24 of the user equipment 22, such as are known as the secondary device from DE 10 2019 118 969 A1 or DE 10 2020 106 369 A1.

The sensor and/or information device 25 has the sensor 28, an optional display screen as output means 30, a control unit 34 comprising a communication module 36, and a power storage medium, such as an accumulator.

In addition, the sensor and/or information device 25 has the actuating element 32, for example, in the form of a pushbutton or owing to the fact that the display screen is configured to be touch sensitive.

The sensor and/or information device 25 is, in particular, a device whose function is limited to specialized applications. To this end, it can be an embedded system and/or have a compact form.

For example, the sensor and/or information device 25 is not a multi-functional device, therefore not a smart device, such as a smartphone, a tablet, a smart watch or smart glasses.

However, it should be noted that these embodiments are purely exemplary for illustration purposes. Alternatively, the sensor and/or information device 25 can be designed without a display screen or without the sensor 28. In these cases, the sensor and/or information device 25 is merely a sensor device or an information device.

It is also conceivable that the sensor device 24 is a smart device, such as a smartphone, a tablet, a smart watch or smart glasses. The sensor 28 is, for example, an optical sensor, such as a barcode reader or a camera. It is also conceivable that the sensor and/or information device 25 as the sensor 28 comprises other sensors, such as an RFID reader, touch sensors or acceleration sensors, in addition to or instead of the optical sensor.

Figure 3:
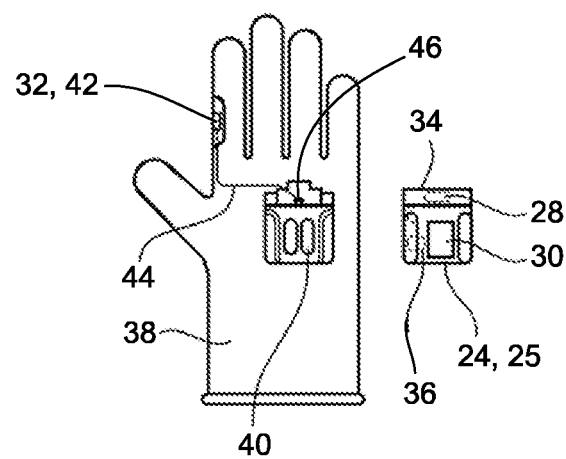
FIG. 3 shows a schematic view of a user equipment according to FIG. 2, FIG. 4: shows a schematic diagram for clarifying the division of sub-processes.

As can be seen in FIG. 3, the user equipment 22 and thus the work system 12 comprises in addition a garment 38, in particular a glove, by means of which the sensor and/or information device 25 can be fastened to the body of the user W. The sensor and/or information device 25 or the user equipment 22 is thus what is termed a "wearable".

To this end, the garment 38 has a holder 40 into which the sensor and/or information device 25 can be attached and removed without tools in a repeatable manner.

The garment 38 can also have an input means 42, for example a trigger for the sensor and/or information device 25. The trigger or the input means 42 can be provided on a finger of the glove. It is also conceivable that said at least one input means 42 or one or more further input means 42 are provided on the holder 40.

By means of at least one cable 44 and at least one contact 46 in the holder 40, the input means 42 is connected to the sensor and/or information device 25 as soon as the sensor and/or information device 25 is inserted into the holder 40.

The input means 42 on the garment 38 can thus also be regarded as an actuating element 32 of the sensor and/or information device 25.

The connection devices 26 are devices that typically have larger computing power as the sensor devices 24, in particular the sensor and/or information devices 25. For example, the connection devices 26 are designed as smart devices, such as a smartphone, a tablet, a smart watch or smart glasses, or a wristband equipped with corresponding processors and communication modules.

In this case, the connection devices 26 are also mobile and are worn by the user W. They are then part of the user equipment 22.

The combination of the sensor and/or information device 25 and the connection device 26 corresponds to the example of the sensor and information system comprising a secondary device (sensor and/or information device 25) and main device (connection device 26) of DE 10 2019 118 969 A1 or DE 10 2020 106 369 A1.

It is however conceivable that the connection device 26 is integrated into the sensor device 24 or the sensor and/or information device 25.

On the one hand, the connection devices 26 maintain a communication link to the process control 20 and, on the other hand, a communication link to the sensor devices 24 or the sensor and/or information devices 25 assigned to them.

The communication link between the connection device 26 and the process control 20 occurs in each case via one of the base stations 16 and is thus from the connection device 26 wireless.

The communication link between the connection device 26 and the sensor devices 24 or the sensor and/or information devices 25 assigned to them also occurs wirelessly, for example using another protocol. A wired communication link is however also conceivable here.

To produce the product, the users W work at the various workstations 14 with the help of the user equipment 22 that has been assigned to them and is worn on their bodies.

While the user W at one of the workstations 14 executes the process steps associated with the sub-process of this workstation 14, the user W uses the sensors 28 of the sensor devices 24 or the sensors 28 are activated automatically.

For example, before installing a component on the product, the worker W must capture a barcode of the product by means of the sensor 28 of the sensor and/or information device 25. To read the barcode, the worker W triggers, for example, the sensor 28 by actuating the input means 42 on the garment 38.

As a result, sensor data is generated, in the described example the value of the barcode, an image of the barcode or the entire image recorded by the barcode reader.

Further examples for sensor data are accelerations, specific acceleration patterns, for example, steps, movement sequences, such as turning movements of the hand for tightening bolts, or gestures, scanned RFID tags and/or temperature measurements.

The sensor data 24 generated by the sensor device 24 is then transmitted to the connection device 26. The connection device 26 transmits the sensor data then on to the process control 20. This can take place by means of a device-internal transmission provided that parts of the process control 20 are configured on the connection device 26.

The process control 20 can then instruct or control the sensor device 24 or the sensor and/or information device 25 at least in part to execute a sub-process or process steps, in particular, this is the sub-process or these are the process steps assigned to the corresponding workstation 14 or even the exact sensor device 24 or the sensor and/or information device 25. To this end, the sub-processes or process steps assigned to the different sensor devices 24 of a user W may differ.

For example, the process control 20 now checks the obtained sensor data, thus in this case the barcode, with the intended process steps that are executed in the building 10 or at the special workstation 14.

In the process control 20, the sub-processes and process steps are stored so that the process control 20 already expects certain sensor data from the sensor device 24 or the sensor and/or information device 25. The process control 20 can now compare the obtained sensor data with the expected sensor data and provide feedback to the user W as a result of the comparison.

Moreover, the process control 20 transmits a control instruction to the same or another sensor device 24 or the same or another sensor and/or information device 25 in order to instruct the user W.

For example, the user W can be informed about whether the user W wants to mount the correct component or has read the correct barcode. The user W can also be transmitted further information by means of the output means 30. To this end, the control instruction comprises, for example, information, in particular text, which is to be shown on the display screen of the sensor and/or information device 25.

The control instruction is transmitted by the process control 20 to the corresponding sensor device 24 or the corresponding sensor and/or information device 25 by means of the connection device 26.

The corresponding sensor device 24 or the corresponding sensor and/or information device 25 receives the control instruction and executes the instructions received in the control instruction.

The user W can then proceed to the next process step or, if other instructions are communicated, execute these.

To this end, the connection device 26 can assume all or parts of these activities of the process control 20 for the purpose of informing and guiding the user. For example, this is disclosed in DE 10 2019 118 969 A1 or DE 10 2020 106 369 A1 in which the monitoring of the correct execution of action sequences—termed sub-processes here—is described in detail. This monitoring can also be executed by the process control 20.

To this end, the individual sub-processes are stored in the process control 20 and/or on the device server 18.

The described example of a building for producing products is to be understood as being merely exemplary. Applications of the method according to the disclosure are also conceivable in other processes. Further examples are warehousing and logistics processes, in which sub-processes are executed such as unpacking goods, filling the warehouse, the targeted procurement of goods from the warehouse (what is termed "picking") and/or the packaging of these goods for dispatch. Even in these sub-processes, the users W can use their own user equipment 22 that needs to be configured for the respective sub-process.

In this case, the workstations 14 are, for example, goods shelves or packing stations.

FIG. 3 illustrates in a very simplified manner the division of a process P into various sub-processes T1 to T7 that among each other are parts of each other.

In the shown example, the sub-processes T1 and T5 result in the process P. The sub-process T1 is comprised in turn of the sub-processes T2, T3 and T4 and the sub-process T5 is comprised of the sub-processes T6 and T7.

The sub-processes T1 and T5 are executed in different production sites, for example different buildings or at different locations.

For example, the sub-process T1 is executed in the building 10, which is shown in FIG. 1, and thus the three sub-processes T2, T3 and T4 at the different workstations 14 from FIG. 1.

For example, the sub-process T2 is executed at the uppermost workstations 14, the sub-process T3 at the middle workstations 14 and the sub-process T4 at the lower workstations 14. For the sake of clarity, the display of both parallel workstations 14 has been forgone in FIG. 4. Therefore, there would have to be two workstations 14 for each sub-process T2, T3 and T4 and thus two blocks in the diagram of FIG. 3.

User equipment 22 is assigned to each of these sub-processes T2, T3, T4, T6 and T7. This means that the user W is to execute this sub-process with the user's corresponding user equipment 22.

As can be seen FIG. 1, two workers W with a user equipment 22 each are assigned to the sub-process T2, three workers W with a user equipment 22 each are assigned to the sub-process T3 and two workers W with a user equipment each are assigned to the sub-process T4.

The sub-processes T1 to T7 are stored in the device server 18 and have been configured, for example, by an administrator of the device server 18, as what is termed a "process owner".

For example, which process steps are to be executed and the sequence of the individual process steps is determined for each sub-process.

Moreover, the results that are expected in the individual process steps, for example a specific barcode that is read, can be determined and it is possible to define which information, for example work instructions, is to be outputted to the user W before, during or after individual process steps.

The data format, in which sensor data has been obtained by means of the sensor 28 and transmitted to process control 20, can also be determined here.

At least one processing step can also be determined here. Said one or more processing steps contain instructions on how the sensor data is to be processed by the user equipment 22 and/or is to be already changed (manipulated). For example, information or an instruction can be that only the last five digits are to be transmitted from a scanned ten-digit barcode. The scanned barcode is then manipulated to the extent that only the last five digits are preserved.

Similarly, the functions of the user equipment 22 can be specified for each sub-process or even each process step, said functions are to be activated to execute this sub-process or the individual process step as these are necessary in that moment.

Similarly, it can also be determined that further functions of the user equipment 22 are blocked at this time.

A sub-process can also be assigned to a location or a section of the process region (also termed "shopfloor") in or at which the sub-process is executed.

It is also conceivable that specifications regarding the communication are set for individual or for every sub-process. For example, specifications on which data transmission protocols and/or radio frequency bands are permitted and prohibited for the communication of the connection device 26 with the base station 16, with other connection devices 26 or with the assigned sensor device 24 or the assigned sensor and/or information device 25.

The specification created in this way for each sub-processes result in a specific, optimal configuration of the user equipment 22 that is to execute this sub-process, i.e., that specific settings must be set on the user equipment 22 to execute this sub-process and that specific information must be contained on the user equipment 22.

These optional settings and information form a configuration set for the associated sub-process. The configuration set contains all information and instructions required for the user equipment 22 to set the settings, i.e., in such a way to attain the optimal configuration that is assigned to the sub-process.

The setup of the sub-processes and thus the configurations and configuration sets is possible, for example, on the device server 18, e.g. through an administrator or any other user with relevant rights. In particular, it is not possible for the users W of the user equipment 22 to change the configurations of the sub-processes.

A configuration set is created for each sub-process and each type of user equipment 22 that is to execute this sub-process.

The configuration sets for each sub-process, which are obtained in this way, are stored on the device server 18.

Figure 4:
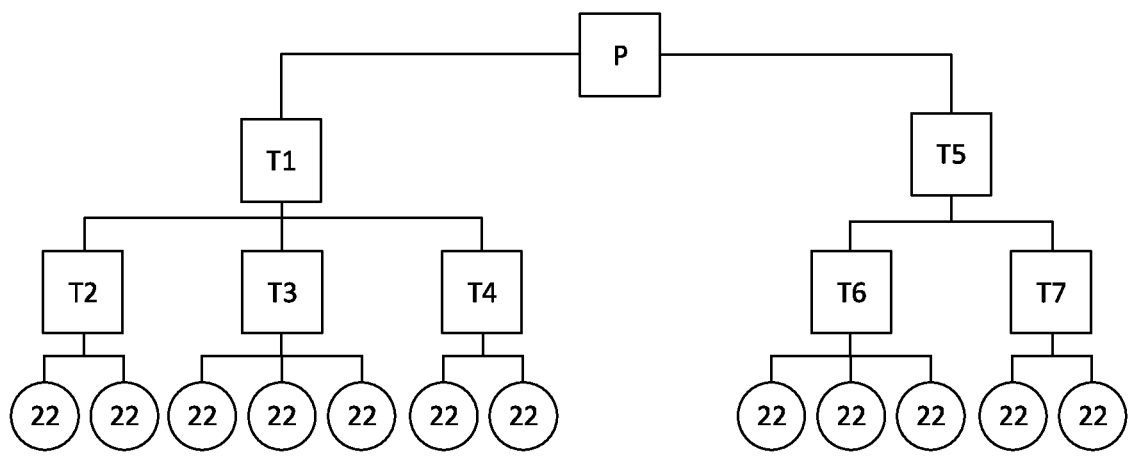

As can be seen in FIG. 4, different user equipment 22 is assigned to different sub-processes.

Figure 5:
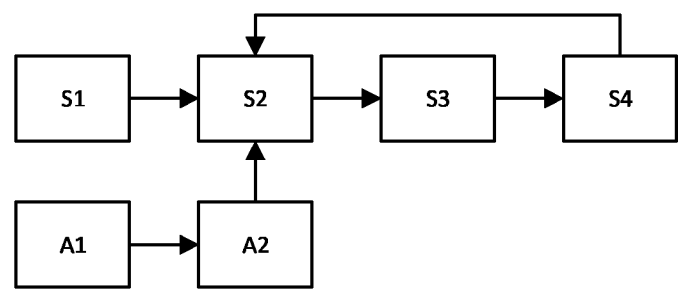
FIG. 5 shows a schematic flow diagram of a method according to the disclosure.

The method according to the disclosure shown in FIG. 5 as a flow diagram is used for the correct configuration of the user equipment 22.

Initially in step S1, it is selected for each of the user equipment 22 which sub-process T1 to T7 this user equipment 22 is to execute and which sub-process the user W of this user equipment 22 is to support. In the example shown in FIG. 1, the sub-process thus determines which workstation 14 the user W is assigned to.

An option for selecting the sub-process is that the user W or a foreman personally selects the sub-process for each user equipment 22 in the process region, i.e., in the building 10, for example by inputting or selecting the sub-process via the input means 42. In the simplest case, this occurs on the main device if this is designed as a smart device.

The selection of the sub-process can occur on the sensor and/or information device 25, on the main device and/or on the secondary device.

It is also possible that an administrator selects on the device server 18 which user equipment 22 is to execute which sub-process.

Alternatively, or additionally, the sub-process to be executed by the user equipment 22 can also be selected by using the user equipment 22 itself.

Here, the user W reads in certain information by means of the sensor 28 of the user equipment 22, said information being able to then determine the sub-process.

For example, the user W reads in a barcode, wherein this barcode has been assigned previously to a sub-process.

For example, this information or barcode can be installed on a door to a particular process region or at the start of a workstation 14.

It is however conceivable that the user W starts the sub-process to be executed using the user equipment 22, and the process control 20 or the device server 18 recognises which sub-process is currently being executed based on the process steps executed by the user equipment 22 (which in this case constitute the information). In this moment, this sub-process is regarded as selected.

Alternatively, or additionally, the use of the main device can also result in a selection or change of a sub-process.

If the main device is designed as a smart device, the main device executes an application, usually however several applications. To this end, a sub-process can be assigned to individual or each of the applications.

It is determined during use, e.g., regularly by the main device itself, which application is currently being operated on the main device, in particular which application is currently being executed in the foreground, which application is currently being shown, which application was executed last and/or which application receives data captured by the secondary device.

That sub-process that is assigned to the application currently being operated is then regarded as selected.

If the application currently being operated changes, for example because the user calls up another application, then the sub-process of the application called up is regarded as selected and, if applicable, the applied configuration is changed.

It is also conceivable that dedicated sub-processes are not only assigned to an application as a whole, but also to individual screens (i.e., screens, masks or screen views) within the same application.

In this case, not only the application currently being operated on the main device, but also the screen currently operated is determined. That sub-process that is assigned to the screen currently being operated is then regarded as selected.

The currently location of the user equipment 22 can also be used as another option for selecting the sub-process to be executed by the user equipment 22.

To this end, the user equipment 22 determines itself, for example through a GPS module or suitable indoor positioning system, its own position and selects the sub-process that is linked to this position.

It is also conceivable that the user equipment 22 transmits its position to the device server 18 that then selects the appropriate sub-process.

Similarly, it is possible that the device server 18 determines the current location of the user equipment 22, for example by determining the base station 16 to which the user equipment 22 is connected and then selecting the corresponding sub-process.

The current time can also be used for selecting the sub-process. The time can be determined by the user equipment 22 and/or the device server 18.

Alternatively, or additionally, it can be provided that only specific users W execute a specific sub-process, for example because only specific users W have the necessary training or qualifications for this sub-process.

In this case, that user W is determined who is currently operating or wearing the user equipment 22. The sub-process to be executed by this user equipment 22 is then selected based on the information about the user W.

The user W can be determined, for example, based on a user identification. The user identification can be linked to a specific user equipment 22 or individual devices thereof. This is then the case, for example, if the main device is permanently assigned to a specific user W.

It is also conceivable that the user W must identify themselves on the user equipment 22 before using the user equipment 22, in particular on the main device. As a result, the user W of the corresponding user equipment 22 is determined and thus the user identification.

In the next step S2, the configuration set that relates to the selected sub-process T1-T7 is transmitted by the device server 18 to the corresponding user equipment 22. The user equipment 22 thus receives the configuration set from the device server 18.

In the next step S3, the user equipment 22, in particular the secondary device, now applies the configuration contained in the configuration set.

The user equipment 22 thus sets all settings automatically as the configuration or the configuration set specifies.

The application of the configuration occurs here automatically, i.e. without the user W needing to approve the application or being able to otherwise prevent this. For example, as soon as a new configuration set has been received from the device server 18, the configuration is applied immediately.

Similarly, the user equipment 22 applies the process steps specified in the configuration set, their sequence, the expected results of the process steps, the instructions to be outputted to the user on the process steps, the data format in which the sensor data is to be obtained and/or to be transmitted to the process control, and/or at least one processing step that indicates how the obtained sensor data is to be processed and/or manipulated before transmission to the process control 20.

Similarly, the functions of the user equipment 22 stored in the configuration set are automatically activated and, provided a corresponding instruction is contained in the configuration set, the remaining functions are deactivated.

In particular, the configuration set contains information on which functions are to be deactivated.

The applied configuration is used immediately, i.e. that the user equipment 22 is configured in such a way as would be desired by the administrator in the setup of the sub-processes on the device server 18 or on the process control 20.

After being applied, the user equipment 22 blocks in step S4 changes to the configurations that have been applied from the configuration set so that the user W of the user equipment 22 cannot change these blocked configurations.

In particular, a change of the configurations is not possible on the user equipment 22 directly.

It is conceivable that the entire configuration of the user equipment 22 applied by the configuration set is blocked so that the user W cannot make any changes to it.

Similarly, it is possible that the parts of the configuration that are to be blocked are determined in the configuration set itself. As a result, the user W may be permitted to personally adjust uncritical configurations, e.g., configurations related to ergonomics.

By blocking changes by the user W, it also guarantees for certain that the user equipment 22 is configured exactly in a way—at least with regard to the critical functions—as was intended in the design of the sub-processes.

It is also conceivable that the user equipment 22 has saved different configuration sets so that a change of configuration is possible without communicating with the device server 18.

For example, if the user equipment 22 determines that it is now situated in a location assigned to another sub-process as the currently loaded sub-process, it can apply the configuration for this new sub-process automatically and independently from the device server 18.

Moreover, updates of sub-processes are easily possible via the method according to the disclosure and it can be ensured that the sub-processes are executed immediately in the changed way.

For example, one of the sub-processes is changed in step A1 or a configuration of the sub-processes is changed, i.e., that the associated configuration set is changed. This can occur on the device server 18 via an administrator. The changed sub-process and the changed configuration set are then automatically rolled out to the user equipment 22.

The user equipment 22 currently assigned to a sub-process that has been changed or whose configuration set has been changed, now receive the updated configuration set of the changed sub-process or the changed, updated configuration set (step A2).

Then, the steps S3 and S4 are executed, namely applying the configuration from the received, now updated configuration set and, if applicable, blocking some or all configurations with regard to changes by the user W.

To ensure that the user equipment 22 is always up-to-date, a check of the actuality of the configuration can be pre-planned to take place when a communication link between the user equipment 22 and the device server 18 exists.

For example, it is checked according to a predefined system or at regular intervals. It is also conceivable that such a check takes place as soon as the communication link between a user equipment 22 and the device server 18 has been established, for example after the user equipment 22 has been activated.

Predefined events can also trigger a check, such as the connection of the user equipment 22 or parts thereof to a power supply. This can occur, for example, as a result of the sensor and/or information device 26 being placed in a charging station.

If the check reveals that the updated sub-processes or the updated configuration sets are available or that the user equipment 22 is to now execute another sub-process, as is described in step S2, the corresponding configuration set is transmitted to the user equipment 22. Then, step S3 and, if applicable, step S4 are executed.

In addition to process reliability, it can be ensured by means of the method that sensitive infrastructure is not disturbed by the use of the user equipment.

In FIG. 1, the building 10 comprises two regions. The sub-processes T2 and T3 are executed in the first region and the sub-process T4 is executed in the second region that is the lower region in FIG. 1.

The second region is separated from the first region by a wall and a door and sensitive infrastructure 48 is located in the second region.

The sensitive infrastructure 48 can contain particularly sensitive technical devices.

It is also conceivable that the sensitive infrastructure 48 merely consists of providing now in the corresponding region specific, normally freely usable radio frequency bands for specific tasks. This is for example the case when the control of machines via radio is not be disturbed by other wirelessly communicating devices. The assignment of different radio frequency bands is determined in what is termed a radio frequency plan.

In the situation shown in FIG. 1, the user W1 has moved from the first region of the building 10 through the door into the second region of the building 10. Thus, the location of the user equipment 22 has changed, what is detected for example by the device server 18.

The current location, i.e. the position in the lower region of the building 10 is assigned to the sub-process T4 so that the sub-process T4 is now selected for the user equipment of the user W1.

The user equipment 22 of the user W1 now receives the corresponding configuration set from the device server 18. It is determined in this configuration set that the wireless communication of the user equipment 22 with the base stations 16, but also the communication between the main device and secondary device must occur at one or more predefined radio frequency bands. The use of the remaining radio frequency bands is prohibited. Which protocols are to be used can also be specified.

The user equipment 22 also now applies this configuration automatically and sends signals only at the permitted radio frequency bands and with the permitted protocol from now on. In this way, the user equipment 22 is prevented from disturbing the sensitive infrastructure 48.

The invention claimed is:

1. A method for configuring a wearable user equipment for executing sub-processes, wherein the user equipment has a communication link with a device server, and different sub-processes and configuration sets for the user equipment associated with the sub-processes are stored on the device server, and wherein the method comprises the following steps:
   selection of one of the sub-processes stored on the device server that is to be executed by the user equipment, and
   automatic application of a configuration of the configuration set associated with the selected sub-process on the wearable user equipment,
wherein changes by the user at least to parts of the configuration of the user equipment applied by the configuration set are blocked.

2. The method according to claim 1, wherein at least one of: the parts of the configuration, whose change by the user is to be blocked, are defined in the configuration set; or an entire configuration of the user equipment applied by the configuration set is blocked for changes by the user.

3. The method according to claim 1, wherein the user equipment comprises at least one of a garment, a glove, a sensor device or an information device that is attached to the garment, wherein the at least one of the sensor device or the information device uses the configuration.

4. The method according to claim 3, wherein the at least one of the garment, the sensor device or the information device comprise at least one input means, wherein at least one function of at least one of the sensor device or the information device is triggered by actuating the input means when the sensor device or the information device, respectively, is received in the garment.

5. The method according to claim 4, wherein the at least one input means is a trigger.

6. The method according to claim 1, wherein the user equipment comprises a main device and a secondary device, wherein the secondary device is at least one of a sensor device or an information device and the main device maintains the communication link to the device server, wherein at least one of the secondary device or the main device use the configuration.

7. The method according to claim 6, wherein at least one of the main device or the secondary device is a wearable smart device.

8. The method according to claim 6, wherein at least one application is executed on the main device, wherein that said at least one application is determined which is currently being operated on the main device,
   wherein the sub-process to be executed by the user equipment is selected based on the application currently being operated.

9. The method according to claim 1, wherein the sub-process to be executed by the user equipment is selected by at least one of:
   input or selection of the sub-process by the user on the user equipment; or
   input or selection of the sub-process by an administrator on the device server.

10. The method according to claim 1, wherein the user equipment comprises a sensor and wherein the sub-process to be executed by the user equipment is selected by reading information by means of the sensor and by determining the sub-process to be selected based on the information read.

11. The method according to claim 1, wherein current location of the user equipment is determined and the sub-process to be executed by the user equipment is selected based on the current location.

12. The method according to claim 11, wherein the user equipment determines the sub-process to be executed by the user equipment based on the current location.

13. The method according to claim 11, wherein the sub-process selected based on the current location is executed at least in part in a region comprising sensitive infrastructure, wherein the user equipment is set by applying the configuration of the configuration set associated with this sub-process in such a way that during use the user equipment avoids disturbing the sensitive infrastructure.

14. The method according to claim 1, wherein at least one of a current time or user of the user equipment is determined and the sub-process to be executed by the user equipment is selected based on at least one of the current time or the user.

15. The method according to claim 1, wherein the configuration determines at least one characteristic of the user equipment.

16. The method according to claim 15, wherein the at least one characteristic of the user equipment is at least one of:
   at least one of permitted radio frequency bands, prohibited radio frequency bands, permitted protocols or prohibited protocols for communication with at least one of the device server, with other user equipment or of parts of the user equipment with each other;
   at least one of process steps for the sub-process, their sequences, expected results of the process steps, instructions to be outputted to the user on the process steps, a data format in which sensor data is obtained, the data format in which the sensor data is transmitted to a process control, or at least one processing step that indicates how the obtained sensor data is to be at least one of processed or manipulated before transmission to the process control; or
   functions of the user equipment required for at least one of a corresponding process step or the sub-process.

17. The method according to claim 1, wherein if at least one of the sub-processes or one of the configuration sets are changed on the device server by an administrator of the device server, the following steps are executed:
   the user equipment that is to execute the changed sub-process or sub-process whose configuration set has been changed, respectively, receive an updated configuration set of the changed sub-process or the changed, updated configuration set, respectively, and
   the configuration of the updated configuration set is applied automatically by the user equipment.

18. The method according to claim 1, wherein when the communication link with the device server exists, the user equipment checks at least one of according to a predefined system, at regular intervals, when establishing the communication link or in predefined events, whether at least one of an updated configuration set is available for a currently executed sub-process or whether the user equipment is to now execute another sub-process and, if applicable, receives from the device server an updated configuration set for the currently executed sub-process or the configuration set for the sub-process to be executed now by the user equipment, respectively.

19. A wearable user equipment that is configured to execute a method comprising the following steps:
   selection of one sub-process stored on a device server that is to be executed by the user equipment, and
   automatic application of the configuration of a configuration set associated with the selected sub-process on the wearable user equipment, wherein changes by the user at least to parts of the configuration of the user equipment applied by the configuration set are blocked.

20. A work system comprising a wearable user equipment and a device server, wherein the work system is configured to execute a method comprising the following steps:
    selection of one sub-process stored on the device server that is to be executed by the user equipment, and
    automatic application of the configuration of a configuration set associated with the selected sub-process on the wearable user equipment,
wherein changes by the user at least to parts of the configuration of the user equipment applied by the configuration set are blocked.

* * * * *

UNITED STATES PATENT AND TRADEMARK OFFICE
CERTIFICATE OF CORRECTION

| | |
|---|---|
| PATENT NO. | : 11,968,092 B2 |
| APPLICATION NO. | : 18/116235 |
| DATED | : April 23, 2024 |
| INVENTOR(S) | : Sebastian Petruch and Matthias Kirchner |

It is certified that error appears in the above-identified patent and that said Letters Patent is hereby corrected as shown below:

On the Title Page

Please add the following:
--(30) Foreign Application Priority Data
March 2, 2022 (DE) ............... 10 2022 104 944.2
December 22, 2022 (DE) ............... 10 2022 134 572.6--

Signed and Sealed this
Second Day of July, 2024

Katherine Kelly Vidal
*Director of the United States Patent and Trademark Office*